(12) United States Patent
Shimamura et al.

(10) Patent No.: US 10,863,049 B2
(45) Date of Patent: Dec. 8, 2020

(54) INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

(71) Applicant: BROTHER KOGYO KABUSHIKI KAISHA, Nagoya (JP)

(72) Inventors: Yasuhiro Shimamura, Nagoya (JP); Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/229,131

(22) Filed: Dec. 21, 2018

(65) Prior Publication Data
US 2019/0199884 A1    Jun. 27, 2019

(30) Foreign Application Priority Data

Dec. 27, 2017 (JP) ................................ 2017-250745

(51) Int. Cl.
*H04N 1/00* (2006.01)
*G06F 1/26* (2006.01)

(52) U.S. Cl.
CPC ......... *H04N 1/00965* (2013.01); *G06F 1/266* (2013.01); *H04N 1/00066* (2013.01); *H04N 1/00888* (2013.01); *H04N 1/00928* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 7,203,044 B2* | 4/2007 | Ando | ...................... | G06F 1/266 361/79 |
| 7,716,499 B2* | 5/2010 | Kobayashi | ............. | H01R 27/00 713/300 |
| 10,244,135 B2* | 3/2019 | Kondo | ............... | H04N 1/00888 |
| 2004/0187042 A1* | 9/2004 | Kawanabe | .............. | G06F 1/266 713/300 |
| 2012/0159228 A1* | 6/2012 | Arimoto | ............ | G03G 15/5004 713/340 |
| 2014/0211239 A1* | 7/2014 | Onishi | ............... | H04N 1/00885 358/1.14 |
| 2015/0194087 A1* | 7/2015 | Choi | ........................ | G09G 3/20 345/212 |
| 2015/0244425 A1* | 8/2015 | Nakase | .................. | H01F 38/14 307/104 |

(Continued)

FOREIGN PATENT DOCUMENTS

JP    2015174373 A    10/2015

*Primary Examiner* — Miya J Williams
(74) *Attorney, Agent, or Firm* — Scully Scott Murphy and Presser

(57) ABSTRACT

An information processing apparatus includes: an interface; and a controller. The controller executes: storing, into a memory, history information relating to supply of electric power to an external device via the interface; rebooting when the reboot is required during supply of the electric power to the external device via the interface; and restarting control of the supply of the electric power to the external device via the interface, based on the history information stored in the memory.

19 Claims, 5 Drawing Sheets

HISTORY INFORMATION

| NEGOTIATION-COMPLETION DATE AND TIME | DEVICE INFORMATION | | JOB-ACCEPTANCE INFORMATION | | | SUPPLY POWER AMOUNT | CONNECTION PORT |
|---|---|---|---|---|---|---|---|
| | VENDOR ID | PRODUCT ID | ACCEPTED OR NOT ACCEPTED | TOTAL NUMBER OF ACCEPTANCES AFTER START-UP | AVERAGE NUMBER PER HOUR (NUMBER/TIME) | | |
| 2017/11/15 15:16:41 | 0x5542 | 0x0A17 | ACCEPTED | 12 | 3 | 20V | USB PORT 1 |
| 2017/11/15 15:18:50 | 0x7755 | 0x05B2 | NOT ACCEPTED | 0 | 0 | 12V | USB PORT 2 |
| 2017/11/15 15:20:55 | 0x2525 | 0x0882 | ACCEPTED | 20 | 5 | 12V | USB PORT 3 |

(56) References Cited

U.S. PATENT DOCUMENTS

| | | | | |
|---|---|---|---|---|
| 2016/0267367 A1* | 9/2016 | Uno | ............................ | B41J 3/44 |
| 2018/0284865 A1* | 10/2018 | Shimamura | ............ | G06F 3/1221 |
| 2018/0284866 A1* | 10/2018 | Sakai | ....................... | G06F 1/325 |
| 2019/0064901 A1* | 2/2019 | Yamane | ..................... | G06F 1/28 |
| 2019/0199880 A1* | 6/2019 | Abe | ................... | H04N 1/00888 |

* cited by examiner

FIG.5

HISTORY INFORMATION

| NEGOTIATION-COMPLETION DATE AND TIME | DEVICE INFORMATION | | JOB-ACCEPTANCE INFORMATION | | | SUPPLY POWER AMOUNT | CONNECTION PORT |
| --- | --- | --- | --- | --- | --- | --- | --- |
| | VENDOR ID | PRODUCT ID | ACCEPTED OR NOT ACCEPTED | TOTAL NUMBER OF ACCEPTANCES AFTER START-UP | AVERAGE NUMBER PER HOUR (NUMBER/TIME) | | |
| 2017/11/15 15:16:41 | 0x5542 | 0x0A17 | ACCEPTED | 12 | 3 | 20V | USB PORT 1 |
| 2017/11/15 15:18:50 | 0x7755 | 0x05B2 | NOT ACCEPTED | 0 | 0 | 12V | USB PORT 2 |
| 2017/11/15 15:20:55 | 0x2525 | 0x0882 | ACCEPTED | 20 | 5 | 12V | USB PORT 3 | great# INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

CROSS REFERENCE TO RELATED APPLICATION

The present application claims priority from Japanese Patent Application No. 2017-250745, which was filed on Dec. 27, 2017, the disclosure of which is herein incorporated by reference in its entirety.

BACKGROUND

The following disclosure relates to an information processing apparatus configured to supply electric power via a USB (Universal Serial Bus) connector, to a method of controlling the information processing apparatus, and to a non-transitory storage medium storing a program executable by the information processing apparatus.

There is known a conventional image processing apparatus configured to supply electric power to an external device according to USB PD (USB Power Delivery) standard, for example. In the image processing apparatus disclosed in Patent Document 1, before supplying the electric power, a negotiation is executed with an external device in communication according to the USB PD standard to determine an amount of the electric power to be supplied to the external device.

SUMMARY

In some cases, image processing apparatuses reboot a system in response to an update of a program, for example. In these cases, the image processing apparatus temporarily stops supplying electric power to an external device or devices at a stop of the system. After rebooting the system, the image processing apparatus executes a negotiation with the external device to restart the supply of the electric power to the external device. However, when the system of the image processing apparatus is temporarily stopped due to the reboot, the supply of the electric power to the external device may not be appropriately restarted, after the reboot, based on a situation before the reboot.

Accordingly, an aspect of the disclosure relates to an information processing apparatus capable of, even in the case where a system is rebooted, appropriately restarting supply of electric power after the reboot, based on a state of supply of the electric power before the reboot, to a method of controlling the information processing apparatus, and a non-transitory storage medium storing a program executable by the information processing apparatus.

In one aspect of the disclosure, an information processing apparatus includes an interface and a controller. The controller is configured to execute: storing, into a memory, history information relating to supply of electric power to an external device via the interface; rebooting when the reboot is required during supply of the electric power to the external device via the interface; and restarting control of the supply of the electric power to the external device via the interface, based on the history information stored in the memory.

Another aspect of the disclosure relates to a method of controlling an information processing apparatus. The information processing apparatus includes an interface. The method includes: a storing step of storing, into a memory, history information relating to supply of electric power to an external device via the interface; a reboot step of executing rebooting when the reboot is required during supply of the electric power to the external device via the interface; and a restart step of restarting control of the supply of the electric power to the external device via the interface, based on the history information stored in the memory.

Still another aspect of the disclosure relates to a non-transitory storage medium storing a program executable by an information processing apparatus. The information processing apparatus includes an interface. When executed by the computer, the program causes the information processing apparatus to execute: storing, into a memory, history information relating to supply of electric power to an external device via the interface; rebooting when the reboot is required during supply of the electric power to the external device via the interface; and restarting control of the supply of the electric power to the external device via the interface, based on the history information stored in the memory.

Still another aspect of the disclosure relates to an information processing apparatus including an interface and a controller. The controller is configured to execute: storing, into a memory, history information relating to supply of electric power to an external device via the interface; rebooting in a case where the reboot is required; and starting control of the supply of the electric power to the external device via the interface, based on the history information stored in the memory.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 5 is a table representing history information.

DETAILED DESCRIPTION OF THE EMBODIMENTS

Figure 1:
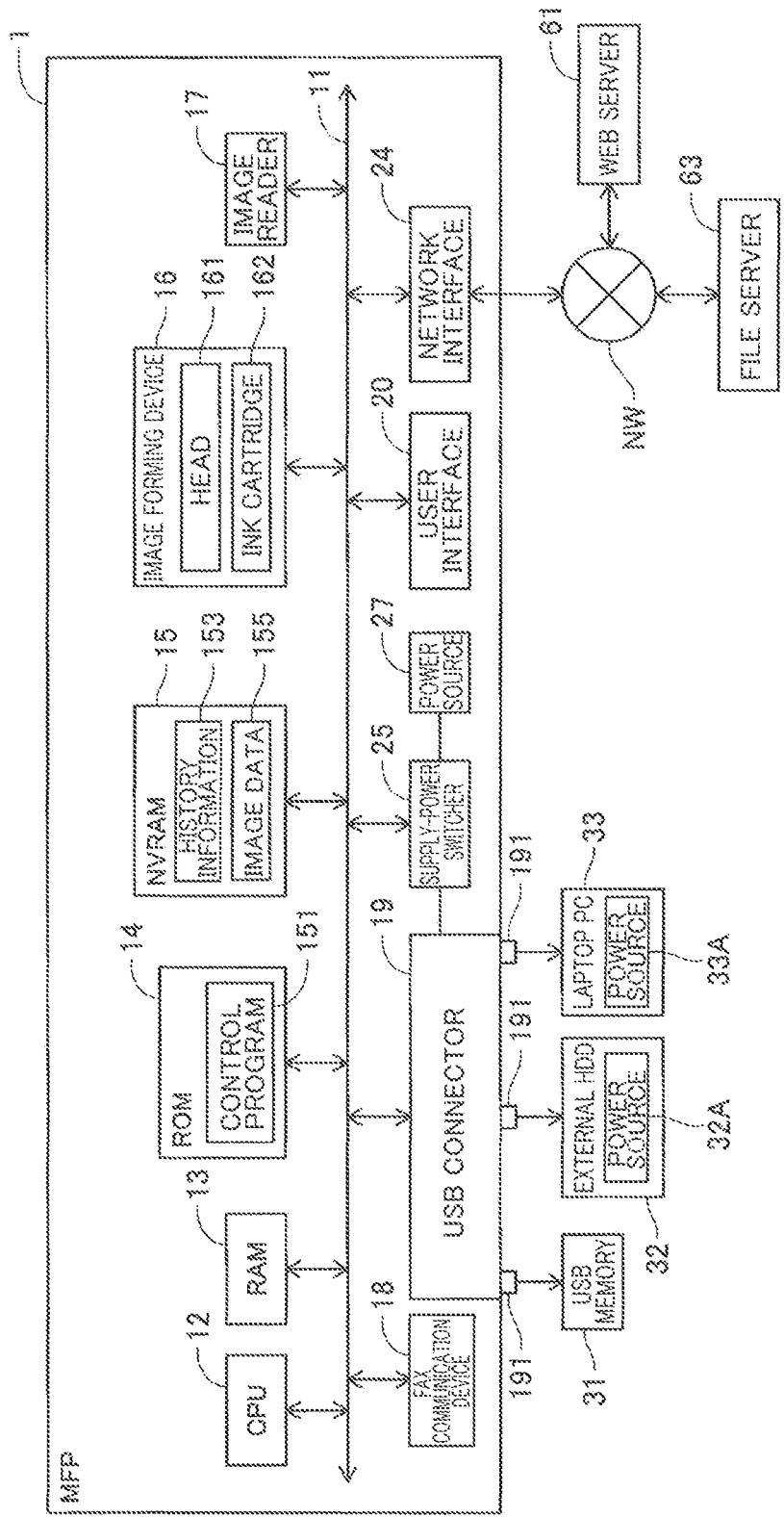
FIG. 1 is a block diagram illustrating an electric configuration of a multi-function peripheral (MFP) according to the present embodiment.

Hereinafter, there will be described a multi-function peripheral (MFP) 1 as one example of an information processing apparatus according to one embodiment with reference to FIG. 1.

Configuration of MFP

The MFP 1 has a printing function, a copying function, a scanner function, and a facsimile function. As illustrated in FIG. 1, the MFP 1 includes a CPU 12, a RAM 13, a ROM 14, an NVRAM 15, an image forming device 16, an image reader 17, a fax communication device 18, a USB (Universal Serial Bus) connector 19, a user interface 20, a network interface 24, and a supply-power switcher 25. These devices are connected to each other by a bus 11. The MFP 1 includes a power source 27 configured to supply electric power supplied from a commercial power source. The power source 27 includes a power code and power supply circuits such as a bridge diode and a smoothing circuit. The power source 27 converts a current supplied from the commercial power source, to a direct current and supplies electric power to the devices of the MFP 1 via power lines.

The ROM 14 is a nonvolatile memory such as a flash memory and stores various programs including a control program 151. For example, the CPU 12 executes the control program 151 read from the ROM 14 to start up a system of the MFP 1. The NVRAM 15 stores history information 153 and image data 155. It is noted that the above-described data locations in the storages are one example. For example, the control program 151 may be stored in the NVRAM 15 as the nonvolatile memory. The history information 153 may be stored in the ROM 14.

The control program 151 is a firmware configured to control devices of the MFP 1, for example. The CPU 12 executes the control program 151 to control the devices connected by the bus 11 while temporarily storing a result of executed processings into the RAM 13. As will be described below, the history information 153 is information representing association between (i) the date and time of completion of a negotiation for power supply in connection according to the USB Power Delivery (USB PD) standard and (ii) device information about an external device to which the electric power is supplied. The image data 155 is image data formed by reading of a document using, e.g., the copying function or the facsimile function, or image data for which a print job is accepted from an external terminal, for example.

The image forming device 16 as one example of a printer includes a head 161 and an ink cartridge 162. The ink cartridge 162 stores ink for printing which is to be supplied to the head 161. The head 161 ejects the supplied ink onto a sheet such as a paper sheet and an OHP sheet. That is, the CPU 12 control the image forming device 16 to perform ink-jet printing of an image on the sheet. It is noted that the printer is not limited to the ink-jet image forming device 16 and may be an electronic-photographic image forming device 16. In this case, the image forming device 16 may include: a photoconductive drum; a developing roller configured to supply toner to the photoconductive drum; an exposing device configured to expose the photoconductive drum; and a toner cartridge storing the toner, for example.

The image reader 17 includes a document support, not illustrated, and an image sensor such as a contact image sensor (CIS) and a charge-coupled device (CCD). The image reader 17 moves the CIS with respect to the document placed on the document support and thereby reads the document to create the image data 155. The fax communication device 18 transmits and receives facsimile data to and from other facsimile machines over a telephone network.

The USB connector 19 is an interface configured to perform communication and transmission of electric power according to the USB PD standard, for example. The USB connector 19 includes three receptacles 191 each as a connector, for example. Each of the receptacles 191 is a connector compliant with the USB Type-C standard, for example. The receptacle 191 includes a plurality of pins for data communication and supply of the electric power, for example. The pins include a D+ pin, a D− pin, and a Vbus pin as connectors in the USB Type-C standard. The receptacle 191 performs data communication using the D+ pin and the D− pin. The receptacle 191 supplies and receives the electric power using the Vbus pin. The Vbus pin is also used for a negotiation for power supply with an external device connected to the receptacle 191. For example, the negotiation for power supply is a processing for setting whether the MFP 1 serves as a power source from which the electric power is to be supplied or as a power sink to which the electric power is to be supplied, and for setting an amount of the electric power to be supplied.

The USB connector 19 is connected to the power source 27 via the supply-power switcher 25. The supply-power switcher 25 is what is called a PD controller. For example, the supply-power switcher 25 switches electric power to be supplied to the external device via the Vbus pin of the USB connector 19. For example, the power source 27 supplies voltages of three types, specifically, 20 V, 12 V, and 5 V, to the supply-power switcher 25. The CPU 12 executes the control program 151 to control the supply-power switcher 25. The supply-power switcher 25 is capable of supplying electric power to the USB connector 19 at a voltage value and a current value combined from among a plurality of types. The CPU 12 controls the supply-power switcher 25 to change a combination of the voltage value and the current value of the electric power to be supplied to the USB connector 19. This results in a change in the voltage value and the current value of the electric power to be supplied to the external device via the USB connector 19.

It is noted that the CPU 12 and the supply-power switcher 25 may be configured as one processing circuit instead of different processing circuits. The control of the electric power supplied via the USB connector 19 may be executed by the CPU 12 controlling the supply-power switcher 25 and may be executed mainly by the supply-power switcher 25. For example, the negotiation of the supply of the electric power may be executed by the CPU 12 or by the supply-power switcher 25. The supply-power switcher 25 is not limited to a switcher configured to supply electric power with a voltage value and a current value combined from among the particular voltage values and the particular current values. For example, the supply-power switcher 25 may control the power source 27 to create electric power with a desired voltage value and a desired current value.

The MFP 1 performs data communication and power supply with various external devices connected to the receptacles 191 (see FIG. 1). Examples of the external devices include various devices connectable according to the USB PD standard, such as a USB memory, a personal computer, an external hard disk, a smartphone, and a card reader. For example, as illustrated in FIG. 1, (i) a USB memory 31 not including a power source, (ii) an external hard disk 32 including a power source 32A, and (iii) a laptop PC 33 including a power source 33A are connected to the respective three receptacles 191. Examples of the power sources 32A, 33A include: a device that receives the electric power supplied from the commercial power source (such as an AC adapter and a power supply circuit); and a battery storing supplied electric power. Each of the external hard disk 32 and the laptop PC 33 is capable of receiving the electric power supplied from the MFP 1 via the USB connector 19 to charge the battery.

The user interface 20 includes a touch screen and a numeric keypad, not illustrated, for example. The CPU 12 controls the touch screen of the user interface 20 to display various kinds of setting screens and an operating state of the MFP 1, for example. The user interface 20 outputs an operation accepted by, e.g., the touch screen or the numeric keypad to the CPU 12 as a signal.

The network interface 24 is a LAN (Local Area Network) interface, for example, and connected to a network NW by a LAN cable, not illustrated. In the present embodiment, a web server 61 owned by a vendor of the MFP 1 and a file server 63 capable of storing data are connected to the network NW, for example. The MFP 1 communicates with the web server 61 to check update information for the control program 151 and so on. The MFP 1 is capable of uploading and downloading the history information 153 and the image data 155 to and from the file server 63.

Power Supply Control

There will be next described power supply control for the USB connector 19 by the MFP 1 according to the present embodiment with reference to FIGS. 2-5. The CPU 12 starts the power supply control illustrated in FIGS. 2-4 by executing the control program 151 stored in the ROM 14 at the start-up of the MFP 1, for example. In the following description, the CPU 12 that executes the control program 151 may be hereinafter referred to simply as "the CPU 12". For example, the wordings "the CPU 12" may mean "the CPU 12 that executes the control program 151".

Figure 2:
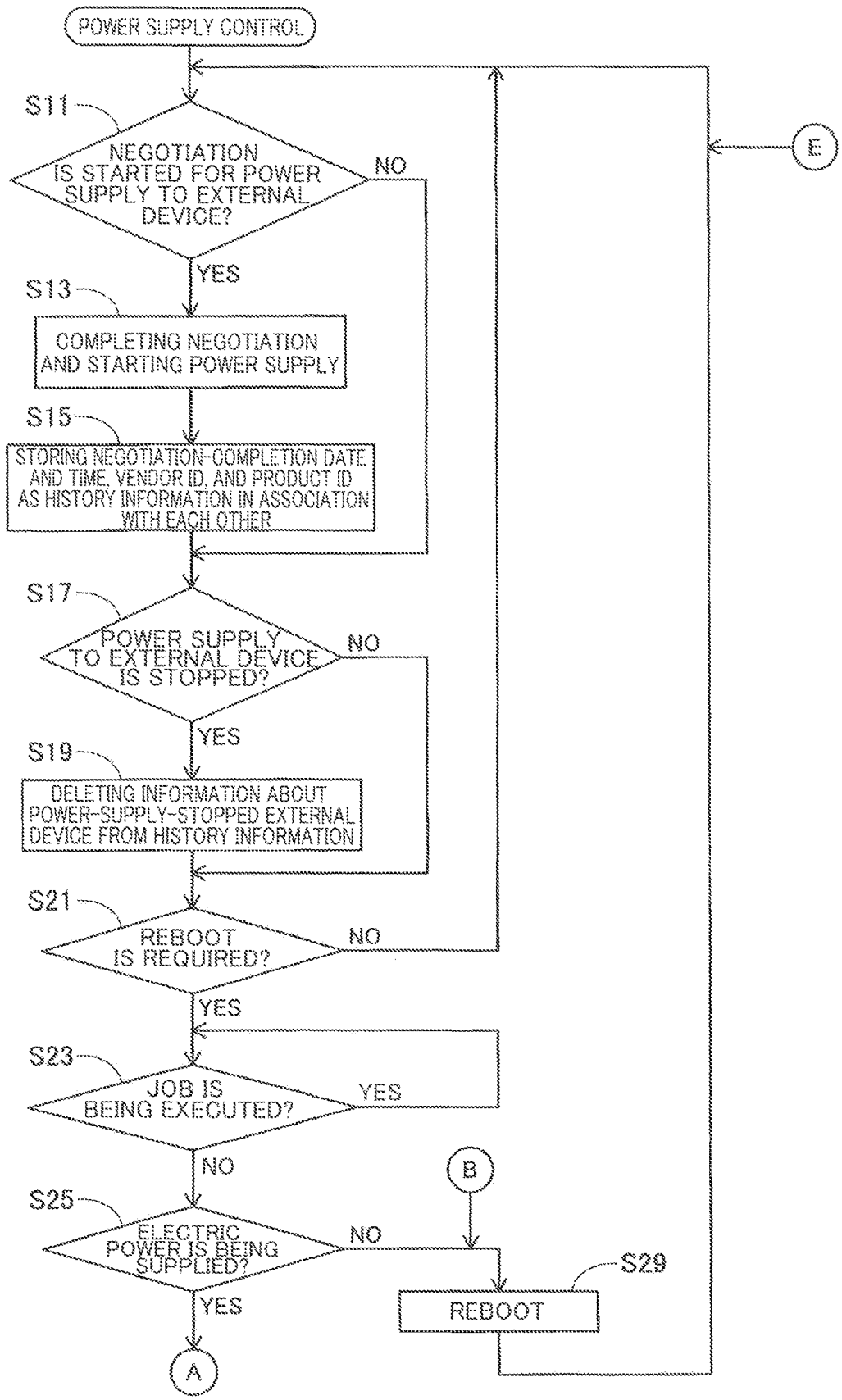
FIG. 2 is a flowchart representing a power supply control.

The flow in FIG. 2 begins with S11 at which the CPU 12 of the MFP 1 determines whether the negotiation is started to supply the electric power to the external device (e.g., the laptop PC 33). When new connection of the external device to the USB connector 19 is detected, for example, the CPU 12 executes the negotiation for starting supply of the electric power to the detected external device in connection according to the USB PD standard. While the following description is provided for a case where the CPU 12 executes control based on the history information 153 for supply of the electric power from the MFP 1 to the external device, the control based on the history information 153 is not limited thereto. For example, the CPU 12 may execute control based on the history information 153 not only for supply of the electric power from the MFP 1 to the external device but also for supply of the electric power from the external device to the MFP 1.

For example, when the external device is newly connected to one of the receptacles 191, the CPU 12 uses the plug and play (PnP) function to request the newly connected external device to transmit the device information to the MFP 1. The device information is USB device information including a vendor ID of a manufacturer of the external device, a product ID, and a USB-device class ID, for example. The CPU 12 also obtains information about requested power of the external device, minimum driving power of the external device, and the presence or absence of the battery in the external device, as the device information. The requested power is electric power requested by the external device, for example. The minimum driving power is a minimum amount of electric power which is required for operation of the external device. The CPU 12 stores the obtained device information into the RAM 13, for example. Thus, each time when the external device is newly connected, device information about the external device is stored into the RAM 13.

When the CPU 12 determines that the negotiation is started (S11: YES), this flow goes to S13. When the CPU 12 determines that the negotiation is not started (S11: NO), this flow goes to S17.

After the completion of the negotiation, the CPU 12 at S13 starts supplying the electric power based on the result of the negotiation. For example, the CPU 12 supplies the requested power requested by the external device in the negotiation, to the external device. It is noted that the CPU 12 may change the electric power to be supplied to the external device in accordance with an amount of suppliable electric power. For example, the CPU 12 may supply the minimum driving power to the external device. In the case where the external device includes the power source 33A like the laptop PC 33, the CPU 12 may receive the electric power supplied from the external device.

After the completion of the processing at S13, this flow goes to S15 at which the CPU 12 stores (i) the date and time of completion of the negotiation at S13 (hereinafter may be referred to as "completion date and time" or "negotiation-completion date and time") and (ii) information for identifying the external device with which the negotiation is executed by the CPU 12, as the history information 153, in a state in which the date and time and the information are associated with each other. The vendor ID and the product ID may be employed as the information for identifying the external device with which the negotiation is executed by the CPU 12. The CPU 12 obtains the vendor ID and the product ID based on the above-described device information.

FIG. 5 is one example of the details of the history information 153. As illustrated in FIG. 5, the negotiation-completion date and time, the vendor ID, and the product ID are associated with the history information 153. In the present embodiment, as illustrated in FIG. 5, the history information 153 stores job-acceptance information associated with the other information. The job-acceptance information relates to acceptance of the job for image processing. The job for the image processing is an instruction for causing the MFP 1 to execute a processing for the image data 155, for example. One example of the job for the image processing is a print job for causing the image forming device 16 to perform printing. The CPU 12 controls the image forming device 16 to perform printing for the image data 155 based on the print job received from the laptop PC 33 (see FIG. 1), for example. Another example of the job for the image processing is a reading job for causing the image reader 17 to read a document to create the image data 155. Based on the reading job received from the laptop PC 33, for example, the CPU 12 controls the image reader 17 to read an image from the document, create the image data 155 from the read image, and transmits the created image data 155 to the laptop PC 33 from which the reading job is transmitted. Another example of the job for the image processing is a job that is a facsimile instruction for creating the image data 155 to be transmitted by the fax communication device 18 and the image data 155 received by the fax communication device 18.

In the case where the job is accepted from the external device via the USB connector 19, the CPU 12 stores information indicating the acceptance, into the history information 153. The history information 153 stores information indicating the presence or absence of the acceptance of the job. Also, the CPU 12 stores the total number of acceptances of the job after the preceding start-up of the system, into the history information 153. Also, the CPU 12 stores an average number of acceptances of the job per hour, into the history information 153.

As illustrated in FIG. 5, the CPU 12 stores a supply power amount into the history information 153 after the completion of the negotiation. The supply power amount is an amount of the electric power supplied to the external device. The CPU 12 stores identification information for identifying a port to which the external device is connected. It is noted that the contents of the history information 153 illustrated in FIG. 5 are one example and may be changed as needed. For example, the CPU 12 may store only the negotiation-completion date and time and the device information as the history information 153. The CPU 12 may only the information indicating the presence or absence of the acceptance as the job-acceptance information into the history information 153. The CPU 12 may store not only the amount of the electric power to be supplied to the external device but also the amount of electric power received from the external device, into the history information 153. The CPU 12 may store information indicating whether the external device is the power source or the power sink, into the history information 153. The CPU 12 may: store the amount of the electric power to be supplied to the external device, into the history information 153 in the case where the external device is set as the power sink; and store the amount of electric power received from the external device, into the history information 153 in the case where the external device is set as the power source.

At S15 in FIG. 2, the CPU 12 temporarily stores the history information 153 into the RAM 13, for example. It is noted that the CPU 12 stores the history information 153 into the NVRAM 15 (at S31 in FIG. 3) in response to reboot of the system as will be described below. That is, the CPU 12 in the present embodiment stores the history information 153 temporarily stored into the RAM 13 at S13, into the NVRAM 15 before the reboot. In the event that enough storage space is not available in the RAM 13, however, the CPU 12 at S13 may directly store the history information 153 into the NVRAM 15, for example.

After the completion of the processing at S15, this flow goes to S17 at which the CPU 12 determines whether supply of the electric power to the external device is stopped. In the case where the external device has been removed from the USB connector 19 or in the case where a power source of the external device is stopped, for example, the CPU 12 stops supplying the electric power to the external device. In the case where the electric power is being supplied to a plurality of the external devices, for example, when the supply of the electric power to at least one of the external devices is stopped, the CPU 12 at S17 determines that the supply of the electric power to the external device is stopped (S17: YES). When the CPU 12 determines that the supply of the electric power to the external device is stopped (S17: YES), this flow goes to S19. When the CPU 12 determines that the supply of the electric power to the external device is not stopped (S17: NO), this flow goes to S21.

The CPU 12 at S19 deletes, from the history information 153, information about the external device for which the supply of the electric power is stopped. Specifically, the CPU 12 deletes the completion date and time, the vendor ID, and so on related to the external device for which the supply of the electric power is stopped, from the history information 153 stored in the RAM 13. As a result, the history information 153 contains only information about the external device or devices to which the electric power is being supplied.

After the completion of the processing at S19, this flow goes to S21 at which the CPU 12 determines whether the system of the MFP 1 needs to be rebooted. The CPU 12 may need to execute a reboot processing when updating the control program 151, for example. The update of the control program 151 includes: a processing for changing the entirety or a portion of the control program 151; and a processing for adding a new program to the control program 151 or deleting a portion of the control program 151. The CPU 12 receives a notification of the update from the web server 61 (see FIG. 1) of the vendor via the network interface 24, for example. Instead, the CPU 12 may regularly check with the web server 61 of the vendor for information about the update. The CPU 12 downloads an update program from the web server 61 upon execution of the update. The CPU 12 updates the control program 151 based the downloaded update program.

When the notification of the update is received, or information about a new update is detected, for example, the CPU 12 determines that the reboot is required (S21: YES). That is, when a new update is issued, the CPU 12 determines that the reboot is required. Instead, the CPU 12 may determine whether the reboot is required, based on the details of the downloaded update program. In this case, the CPU 12 determines whether the reboot is required, each time when a new update is issued. The notification of the update or the update program may contain information indicating whether the reboot is required.

The CPU 12 may at S21 determine whether the reboot is required, based on information different from the update. For example, the CPU 12 may determine whether the reboot is required, based on an error caused in the MFP 1. In the case where the reboot is performed for a reason different from the update, the CPU 12 may execute the processing at S31 after the processing at S25, without executing determination of the importance of the update (at S27 in FIG. 3) and processings related to a result of the determination (S33, S35) which will be described below.

When the CPU 12 at S21 determines that the reboot is not required (S21: NO), this flow returns to S11. Thus, the CPU 12 repeats the processings at S11-S21 in a state in which the reboot of the system is not executed, i.e., a normal state. In this case, the CPU 12 in the normal state monitors (i) a starting status of a negotiation executed in response to new connection of the external device and (ii) a status of a stop of the supply of the electric power to the external device. The CPU 12 repeats the processings at S11-S21 to continue updating the history information 153. The history information 153 always stores latest connection information.

When the CPU 12 determines at S21 that the reboot is required (S21: YES), the CPU 12 at S23 determines whether the job for the image processing (e.g., the print job) is being executed. When the reboot is executed during execution of the job for the image processing, printing or the like cannot be completed. Thus, when the CPU 12 at S23 determines that the job is being executed (S23: YES), the CPU 12 repeats the determination processing at S23. When the CPU 12 determines that the job is not being executed (S23: NO), this flow goes to S25. Thus, when the job is being executed, the CPU 12 does not execute the reboot.

The CPU 12 at S25 determines whether the electric power is being supplied to the external device via the USB connector 19. When the electric power is being supplied from the MFP 1 to the external device (S25: YES), this flow goes to S27 in FIG. 3. When no electric power is being supplied to the external device due to, e.g., no external devices connected to the USB connector 19 (25: NO), this flow goes to S29. In this case, since no electric power is supplied in connection according to the USB PD standard, a negotiation after the reboot based on the history information 153, which will be described below, is not required.

Thus, the CPU 12 executes the reboot at S29. For example, the CPU 12 terminates all the programs being executed and stops supply of the electric power from the power source 27 to the devices in the MFP 1 other than the CPU 12. After stopping the supply of the electric power, the CPU 12 executes the control program 151 read from the ROM 14, to start up the system again. After starting up the system, the CPU 12 starts the power supply control represented in FIGS. 2-4. It is noted that the CPU 12 may not execute the reboot automatically. For example, the CPU 12 may control the touch screen of the user interface 20 to display a message for asking reconnection after turning a power switch off. That is, the CPU 12 may have the user perform turning-off of the power source and connection.

In the case where the processing at S29 is executed, the electric power is not supplied to the external device before the reboot (S25: NO). In this case, when executing the processings at S11 and subsequent steps after the reboot, for example, the CPU 12 does not execute the USB PD negotiation with any external device until connection to the USB connector 19 is changed (e.g., insertion or removal of the USB memory). Thus, even if the external device, which is being connected to the USB connector 19 before the reboot and to which no electric power is supplied, is connected to the USB connector 19 after the reboot, no electric power is supplied to the external device. That is, the state before the reboot in which no electric power is supplied is reproduced. When the external device to which no electric power is supplied is removed from the USB connector 19 and then connected to the USB connector 19 again, the CPU 12 starts a negotiation with the external device by using the plug and play (PnP) function (S11: YES). Instead, the CPU 12 may start a negotiation (S11: YES) in the case where the CPU 12 receives a negotiation for new supply of the electric power from the connected external device. The CPU 12 stores information indicating that no electric power has been supplied, into the NVRAM 15 as the history information 153 when executing the processing at S29, for example. The CPU 12 can read the history information 153 stored in the NVRAM 15, after the reboot to reproduce the state in which no electric power is supplied before the reboot.

It is noted that the CPU 12 may not reproduce the state in which no electric power is supplied before the reboot. For example, the CPU 12 may execute a new negotiation with the external device connected to the USB connector 19, after executing the reboot.

Figure 3:
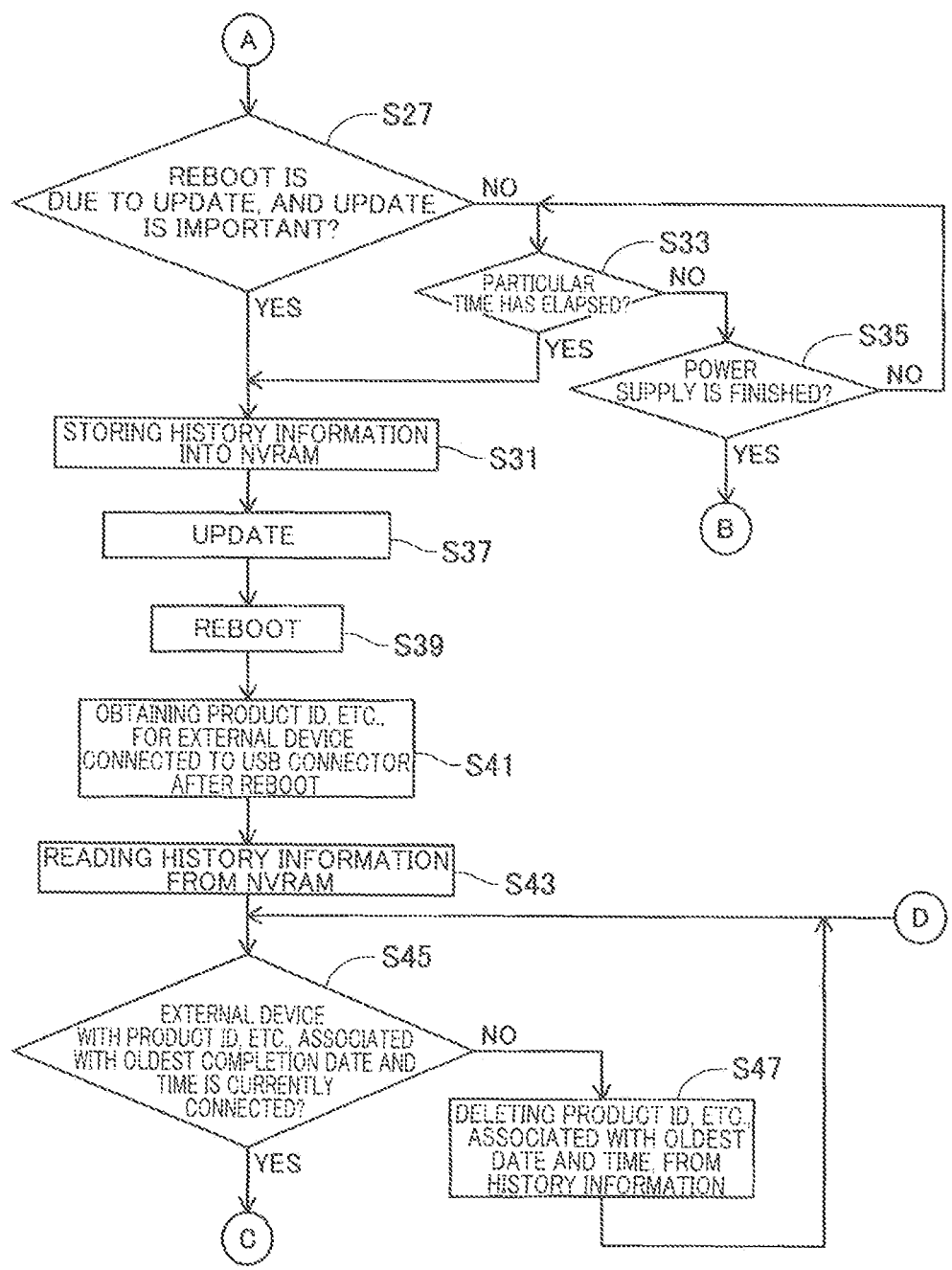
FIG. 3 is a flowchart representing the power supply control.

At S27 in FIG. 3, the CPU 12 determines whether the reboot to be executed is due to the details of the update and whether the update is important. One example of the important update is a security update for applying an update program for removing a security hole to the control program 151. Another example of the important update is an update for avoiding a stop and a failure of the system. That is, the important update is an update that has to be executed as soon as possible. Updates that are not important are updates that do not necessarily require immediate execution of the update. That is, the updates that are not important are updates not causing a stop or a failure of the system even if the update is executed immediately. Examples of the updates that are not important include: application of an update program relating to image processing for improving its speed; and application of an update program for reducing power consumption.

For example, information about the importance (i.e., the degree of importance) of the update is set for each of the update programs and information sent from the vendor. The CPU 12 at S27 determines whether the update is important, based on the information about the importance. It is noted that the CPU 12 may determine the importance of the update based on other information. For example, the CPU 12 may determine the importance of the update based on the details of the update program or the type of a program to which the update program is to be applied.

When the CPU 12 at S27 determines that the reboot to be executed is due to the details of the update and the update is important (S27: YES), the CPU 12 at S31 stores the history information 153 updated at S15 and/or S19 and stored in the RAM 13, into the NVRAM 15. This prevents data of the history information 153 to be deleted due to the reboot. It is noted that the storage location of the history information 153, i.e., the storage in the present disclosure, is not limited to a storage device in the MFP 1. For example, the CPU 12 may store the history information 153 stored in the RAM 13, into an external device connected to the USB connector 19 (e.g., the external hard disk 32) or a memory (as one example of a memory) in the file server 63 (see FIG. 1) connected to the network interface 24. The CPU 12 may read the history information 153 from the external device or the file server 63 after the reboot.

When the CPU 12 at S27 in FIG. 3 determines that the update is not important (S27: NO), the CPU 12 at S33 determines whether a particular length of time has elapsed. This particular length of time is a time for which the CPU 12 suspends (waits for) execution of the reboot that is to be caused due to the update. In other words, the supply of the electric power is continued for this particular length of time without update and reboot. The CPU 12 uses a predetermined length of time as the particular length of time used for the determination at S33, for example. Instead, the CPU 12 may change the particular length of time used for the determination at S33, depending upon the details of the update, for example. After the negative decision (NO) is made at S27, the CPU 12 at S33 determines whether twelve hours have elapsed as the particular length of time. In this case, after continuing the supply of the electric power half a day without executing update and reboot, the CPU 12 executes the update and the reboot which will be described below. It is noted that in the case where a length of time for which the MFP 1 is not used has continued for the particular length of time, for example, the CPU 12 may execute the processings at S31 and subsequent steps. In this case, the length of time for which the MFP 1 is not used by the user has continued, the CPU 12 executes the update and the reboot.

The CPU 12 executes the processing at S31 when the CPU 12 determines that the particular length of time has elapsed (S33: YES). When the CPU 12 determines that the particular length of time has not elapsed (S33: NO), the CPU 12 at S35 determines whether supply of the electric power to the external device is finished. It is noted that, depending upon the length of the particular length of time used at S33, the CPU 12 may update the history information 153 until the CPU 12 executes the processing at S31. For example, in the case where the particular length of time at S33 is several minutes to several tens of minutes, there is a low possibility that the connection status of the USB connector 19 is changed. In the case where the particular length of time at S33 is several hours to several tens of hours, in contrast, there is a high possibility that the connection status of the USB connector 19 is changed. Thus, the CPU 12 may execute the processings at S11, S13, S15, S17, and S19 until the CPU 12 executes the processing at S31 after the execution at S27 (S27: NO), and the particular length of time has elapsed (S33: YES), for example. In this case, the CPU 12 updates the history information 153 when a status of supply of the electric power to the external device is changed until the execution of the processing at S31. The history information 153 is updated to information on the latest connection status.

When the CPU 12 determines at S35 that the supply of the electric power to the external device is finished (S35: YES), the CPU 12 executes the processing at S29 in FIG. 2, that is, the CPU 12 executes the reboot. For example, the CPU 12 executes the processing at S29 in the case where all the external devices connected to the USB connector 19 are removed, or the power source of the external device connected to the USB connector 19 is turned off before the particular length of time has elapsed. Also, the CPU 12 executes the processing at S29 in the case where stop of the supply of the electric power according to the USB PD standard is requested from all the external devices connected to the USB connector 19, for example. This is because a negotiation for the reboot based on the history information 153 which will be described below becomes unnecessary since the supply of the electric power in connection according to the USB PD standard is finished as in the processing at S25 (S25: NO).

The CPU 12 at S31 stores the history information 153 from the RAM 13 into the NVRAM 15. The CPU 12 executes an update at S37 after storing the history information 153. The CPU 12 applies the update program downloaded from the web server 61 of the vendor, to the control program 151, for example. The CPU 12 stores the updated control program 151 into the ROM 14. After the update at S37, the CPU 12 executes the reboot at S39. As in the processing at S29, the CPU 12 at S39 starts up the system after the system is stopped once.

After the reboot at S39, the CPU 12 at S41 obtains the vendor ID and the product ID associated with the external device being connected to the USB connector 19. The CPU 12 obtains the product ID and so on from the external device by using a communication command compliant with the USB PD standard.

After the completion of the processing at S41, the CPU 12 at S43 reads the history information 153 stored at S31, from the NVRAM 15. At S45, the CPU 12 executes determination based on the product ID and so on obtained at S41 and the history information 153 read at S43. As illustrated in FIG. 5, the history information 153 stores information indicating a relationship among the date and time of completion of the negotiation at S13 (as one example of first information), the vendor ID, and the product ID. The history information 153 stores data in the order from the data with the oldest completion date and time, for example. That is, the external device associated with the oldest negotiation-completion date and time (one example of a third external device) executes a negotiation with the CPU 12 of the MFP 1 for supply of the electric power before the external device associated with the second oldest negotiation-completion date and time (as one example of a first external device). Thus, it is possible to consider that the negotiation-completion date and time for each of the external devices (as one example of the first information) is information indicating that an external device associated with a certain negotiation-completion date and time (as one example of the third external device) has executed a negotiation before an external device associated with a negotiation-completion date and time older than the certain negotiation-completion date and time (as one example of the first external device). The CPU 12 searches for the oldest completion date and time and the vendor ID and the product ID associated with the completion date and time from among the history information 153. The external device associated with the product ID detected by this search is an external device with the oldest negotiation-completion date and time among a plurality of the external devices to which the electric power is being supplied before the current reboot and after the preceding reboot. The CPU 12 at S45 determines whether the detected vendor ID and product ID coincide respectively with the vendor ID and the product ID obtained at S41. That is, the CPU 12 at S45 determines whether the external device corresponding to the vendor ID and the product ID associated with the oldest completion date and time is currently connected.

When the CPU 12 at S45 determines that the external device corresponding to the product ID and so on associated with the oldest completion date and time is not currently connected (S45: NO), the CPU 12 at S47 deletes data relating to the product ID and so on from the history information 153. That is, the CPU 12 deletes, from the history information 153, data, such as the vendor ID, the product ID, and the negotiation-completion date and time, associated with the external device that has not been connected. This operation deletes, from the history information 153, information about the external device being connected before the reboot but disconnected during or after the reboot.

After the completion of the processing at S47, the CPU 12 executes the processing at S45 again. When the processing at S47 is executed, data with the oldest completion date and time (one example of third identification information older than first identification information) is deleted from the history information 153. Thus, data with the second oldest completion date and time (as one example of the first identification information) newly becomes data with the oldest completion date and time. When the CPU 12 executes the processing at S45 again, the CPU 12 determines whether the external device with the second oldest completion date and time at the preceding determination at S45 (as one example of the first external device) is currently connected. Accordingly, each time when the processings at S45 and S47 are executed, the CPU 12 executes the determination sequentially for the second oldest data, the third oldest data, and so on.

When the CPU 12 at S45 determines that the external device corresponding to the product ID and so on associated with the oldest completion date and time is currently connected (S45: YES), the CPU 12 executes a negotiation with the external device corresponding to the product ID and so on associated with the oldest completion date and time and starts supplying the electric power (at S49 in FIG. 4). Accordingly, after the reboot, the CPU 12 executes a negotiation with the external devices being connected after (upon the completion of) the reboot in the order from the oldest negotiation-completion date and time before the reboot. That is, the CPU 12 assigns a higher priority to a negotiation with the external device corresponding to the oldest negotiation-completion date and time (as one example of the third external device) than to a negotiation with the external device corresponding to the second oldest negotiation-completion date and time (the one example of the first external device). In other words, the CPU 12 executes the negotiation with the external device corresponding to the oldest negotiation-completion date and time before the external device corresponding to the second oldest negotiation-completion date and time.

Here, the USB PD standard permits the electric power to be supplied to the external device, to be changed by a negotiation. Thus, the electric power to be supplied to the external device may be changed in accordance with the order of negotiations. For example, the CPU 12 supplies requested electric power to the external device in the order from the external device having executed a negotiation first. In this case, when an amount of electric power to be supplied to the external device exceeds a permissible value of the MFP 1, there is a possibility that requested electric power is not supplied to external devices detected later. In another case, the CPU 12 receives electric power from the PC via the USB connector 19, for example. In this case, even if the MFP 1 is short of electric power, the shortage of the electric power may be resolved by completing a negotiation with the PC as a power source. The amount of the electric power suppliable from the MFP 1 increases after its connection to the PC. Accordingly, there is a possibility that requested electric power is not supplied to the external device having executed a negotiation before the completion of the connection to the PC, and requested electric power is supplied to the external device having executed a negotiation after the completion of the connection to the PC.

That is, in the case where the order of negotiations after the reboot is different from the order of negotiations before the reboot, the amount of electric power to be supplied to each of the external devices may be changed. To avoid this change, the CPU 12 in the present embodiment uses the history information 153 stored before the reboot to execute negotiations again in the order from the external device with the oldest completion date and time. This operation can reproduce a state of supply of the electric power from the MFP 1 to the external devices before the reboot. In the case where not only the amount of the electric power to be supplied from the MFP 1 to the external device but also an amount of electric power received from the external device is stored as the history information 153, it is possible to reproduce a state of transmission and receipt of the electric power, which state includes a state of receipt of the electric power before the reboot.

Figure 4:
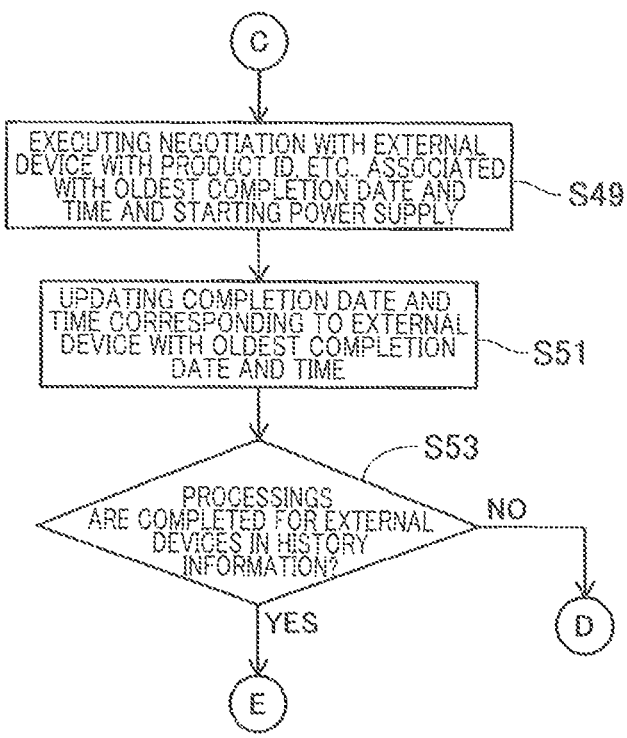
FIG. 4 is a flowchart representing the power supply control.

At S49 in FIG. 4, the CPU 12 starts supplying the electric power to the external device corresponding to the product ID and so on associated with the oldest completion date and time. At S51, the CPU 12 updates the completion date and time corresponding to the external device for which the supply of the electric power is started at S49. That is, the CPU 12 updates the completion date and time in the history information 153 which corresponds to the external device with the oldest negotiation-completion date and time. As a result, the oldest completion date and time becomes the latest completion date and time. Thus, as in the processing at S47, each time when the processing at S51 is executed, the CPU 12 updates data associated with the oldest completion date and time.

After the completion of the processing at S51, the CPU 12 at S53 determines whether the processings are completed for all the external devices included in the history information 153 read at S43. That is, the CPU 12 determines whether the processings are completed for all the external devices to which the electric power is supplied before the reboot. For example, the CPU 12 determines whether the processings are completed for all the external devices by determining whether the deleting processing at S47 or the update processing at S51 is executed for all the external devices included in the history information 153. It is noted that the method of determining whether the processings are completed for all the external devices is not limited to the above-described method. For example, the CPU 12 may determine whether the processings are completed for all the external devices by determining whether each of all the completion dates and times contained in the history information 153 is later than or the same as the date and time at which the processing at S43 is executed.

When the processings are not completed for all the external devices (S53: NO), the CPU 12 executes the processing at S45 in FIG. 3 again. When the CPU 12 determines that the processings are completed for all the external devices (S53: YES), the CPU 12 executes the processing at S11 in FIG. 2 again. That is, the CPU 12 executes the processing at S11 after completing the negotiations and so on for all the external devices to which the electric power is supplied before the reboot. In the case where there is an external device newly connected after the reboot, the CPU 12 starts a negotiation at S11. Thus, the CPU 12 in the present embodiment executes a negotiation for supply of the electric power in response to the update and the reboot.

It is noted that the CPU 12 determines the order of the external devices for the negotiations after the reboot, based on the order of the negotiations before the reboot (i.e., based on the completion date and time) in the above-described example, but the present disclosure is not limited to this configuration. For example, the CPU 12 may determine the order of negotiations to be executed after the reboot, based on the job-acceptance information illustrated in FIG. 5. For example, the CPU 12 may at S45 execute the determination of the connection status by assigning a high priority to the external device that is associated with the oldest negotiation-completion date and time and that has received the job before the reboot. With this configuration, the CPU 12 executes a negotiation for supply of the electric power with the external device from which the MFP 1 has received the job before the reboot, with a high priority. That is, a high priority can be assigned to the external device from which the MFP 1 has received the job and with which the MFP 1 has actually communicated for printing, for example. Alternatively, the CPU 12 uses the job-acceptance information of the history information 153 to execute a negotiation first with an external device from which the MFP 1 has received many jobs before the reboot or an external device with a large average number of receipts of the job.

The CPU 12 at S49 executes the negotiation after the reboot. In this processing, the CPU 12 may determine an amount of the electric power to be supplied to the external device after the reboot, based on the supply power amount in the history information 153. This configuration enables the CPU 12 to determine the amount of the electric power to be supplied to the external device after the reboot, based on the actual supply power amount before the reboot. The CPU 12 may quickly complete the negotiation by omitting a processing for inquiring the external device about a required electric power amount, for example. It is noted that, after the reboot, the CPU 12 may supply electric power that is the same value as the supply power amount in the history information 153, to the external device and may supply electric power that is less than or equal to the supply power amount in the history information 153, to the external device. In the case where the amount of electric power received from the external device is stored in the history information 153, the CPU 12 may determine the amount of power requested to the external device after the reboot, based on the received power amount in the history information 153. This configuration enables the CPU 12 to determine the amount of power requested to the external device after the reboot, based on an amount of the electric power actually received before the reboot.

The MFP 1 is one example of an information processing apparatus. The CPU 12 is one example of a controller. Each of the NVRAM 15, the external hard disk 32, and the file server 63 is one example of a storage. The ROM 14 is one example of a nonvolatile memory and a non-transitory memory. The image forming device 16 is one example of a printer. The image reader 17 is one example of a reader. The power source 27 is one example of a power source. Each of the USB memory 31, the external hard disk 32, and the laptop PC 33 is one example of an external device. The laptop PC 33 is one example of an external terminal. Each of the vendor ID and the product ID is one example of identification information. S31 is one example of a storing step. S39 is one example of a reboot step. S43 is one example of a reading step. S49 is one example of a restart step.

Effects

The embodiment described above achieves the following effects. The MFP 1 according to the present embodiment includes: the power source 27; the CPU 12; and the USB connector 19 configured to receive electric power from the power source 27. External devices such as the USB memory 31 are connectable to the USB connector 19 in connection according to the USB PD standard. The CPU 12 executes: a storing processing (S31) for storing, into the NVRAM 15, the history information 153 relating to supply of the electric power to the external device via the USB connector 19; a reboot processing (S39) for executing a reboot when the reboot is required during supply of the electric power to the external device via the USB connector 19; a reading processing (S43) for reading the history information 153 stored in the storing processing, from the NVRAM 15 after the reboot; and a restart processing for restarting control of the supply of the electric power to the external device via the USB connector 19, based on the history information 153 read from the NVRAM 15.

Here, when restarting supply of electric power after the reboot, an information processing apparatus configured to supply the electric power in connection according to the USB PD standard may execute negotiations with external devices sequentially to set an amount of the electric power to be supplied to each of the external devices, for example. In this case, there is a possibility that the amount of the electric power to be supplied to each of the external devices is different between before and after the reboot, depending upon the order of the negotiations. In the present embodiment, in contrast, the CPU 12 stores the history information 153 about supply of the electric power to the external devices via the USB connector 19 before the reboot. When the reboot is executed during supply of the electric power, the CPU 12 reads the history information 153 after the reboot and restarts the control of the supply of the electric power based on the history information 153. This configuration makes it possible to restart supply of the electric power after the reboot based on a state of the supply of the electric power before the reboot even in the case where the system is rebooted.

The MFP 1 includes the NVRAM 15 that is a nonvolatile memory as the storage. This configuration enables the MFP 1 to store the history information 153 even if supply of the electric power to the NVRAM 15 is stopped due to the reboot.

When the reboot is required during supply of the electric power to the external device via the USB connector 19, the CPU 12 executes the storing processing (S31) and executes the reboot (S39) when the storing processing is completed.

This configuration enables the CPU 12 to execute the reboot after reliably storing the history information 153. In other words, the CPU 12 does not start the reboot before storing the history information 153, making it possible to reduce occurrences of such a situation that the history information 153 is deleted by the reboot.

The history information 153 includes the first identification information (e.g., the vendor ID and the product ID) for identifying the external device being connected to the USB connector 19 before the reboot (see FIG. 5). The CPU 12 executes: an identification-information determination processing (S45) for determining in the restart processing whether the first identification information of the history information 153 corresponds to the identification information for identifying the external device being connected to the USB connector 19 after the reboot (one example of second identification information); and a negotiation processing (S49) for executing a negotiation for power supply with the external device via the USB connector 19 based on the history information 153, when the first identification information and the second identification information correspond to each other in the identification-information determination processing.

With this configuration, the CPU 12 determines, based on the product ID and so on, whether the external device being connected before the reboot and the external device being connected after the reboot correspond to each other. The CPU 12 executes a negotiation based on the history information 153, with the external device corresponding to the product ID and so on. This configuration enables the CPU 12 to start the negotiation based on the history information 153 after rechecking connection by a check of the product ID and so on and to execute setting of the electric power amount in accordance with a state before the reboot, for example.

The history information 153 includes a plurality of sets of the first identification information (the product ID and so on). When the CPU 12 determines in the identification-information determination processing that there are a plurality of external devices corresponding respectively to a plurality of the products ID or the like, the CPU 12 in the negotiation processing assigns a higher priority to a negotiation with an external device corresponding to the product ID and so on that is old in a history than to a negotiation with an external device corresponding to the product ID and so on that is new in the history among the plurality of external devices (S45).

With this configuration, in the case where there are a plurality of external devices corresponding to the product ID and so on after the reboot, the CPU 12 first executes a negotiation with the external device that is old in the history (S45). This configuration enables the CPU 12 to execute negotiations in the order of the negotiations executed before the reboot, from the external device with the oldest connection.

The MFP 1 includes the ROM 14 storing the control program 151. The CPU 12 controls the MFP 1 by executing the control program 151. The CPU 12 executes the reboot (S39) when an update of the control program 151 stored in the ROM 14 is required (S27: YES).

With this configuration, even in the case where the reboot is caused due to an update of the control program 151 to be used for control of the MFP 1, supply of the electric power after the reboot can be restarted based on a state of supply of the electric power before the reboot.

The CPU 12 executes: the importance determination processing (S27) for determining whether the importance of the update of the control program 151 is high; the reboot (S37, S39) after executing the update when the CPU 12 determines that the importance of the update is high; and a continuation processing (S33, S35) for continuing the supply of the electric power to the external device via the USB connector 19 without executing the update, when the CPU 12 determines that the importance of the update is not high.

With this configuration, the CPU 12 executes the update immediately when the importance of the update is high. When the importance of the update is not high, the CPU 12 continues supplying the electric power without executing the update immediately. This operation can improve a security level by speedily executing a highly important update such as the update program for a security hole, for example. Furthermore, it is possible to continue the supply of the electric power, leaving an update that is not highly important until later. One example of the update that is not highly important is an improvement in the speed of the image processing.

When the importance of the update is not high (S27: NO), the CPU 12 in the continuation processing waits for a particular length of time without executing the update (S33: YES), and then executes the reboot after executing the update (S37, S39).

With this configuration, the CPU 12 continues supplying the electric power for the particular length of time and thereafter executes the suspended update. Adjustment of the length of the particular length of time enables the CPU 12 to execute the update that is not highly important, in a period in which the MFP 1 is not frequently used, for example. That is, the time of execution of the update that is not highly important can be adjusted in accordance with actual uses of the MFP 1.

When the reboot is required during supply of the electric power to the external device via the USB connector 19 (S21: YES), the CPU 12 executes a job-execution determination processing (S23) for obtaining a job relating to an image processing from the external device to which the electric power is being supplied, and determining whether the job is being executed. When the CPU 12 determines in the job-execution determination processing that the job is being executed (S23: YES), the CPU 12 waits without executing the reboot. When the CPU 12 determines in the job-execution determination processing that the job is not being executed (S23: NO), the CPU 12 executes the reboot (S39).

With this configuration, before executing the reboot, the CPU 12 determines whether the job obtained from the external device is being executed. When the job is being executed, the CPU 12 waits without executing the reboot until the completion of the execution of the job. When the execution of the job is finished, the CPU 12 executes the reboot. This configuration can reduce occurrences of such a situation that the job being executed is interrupted by the reboot.

The history information 153 includes the job-acceptance information (see FIG. 5) indicating whether a job relating to the image processing which is transmitted from the external device is accepted before the reboot. In the case where a plurality of the external devices are being connected to the USB connector 19 after the reboot, the CPU 12 may restart control of supply of the electric power via the USB connector 19 based on the job-acceptance information of the history information 153 in the restart processing by assigning a higher priority to the external device having accepted the job among the external devices connected to the USB connector 19.

It is noted that control for assigning a high priority to the external device having accepted the job is not limited in particular. In the case where control of the supply of the electric power is restarted by assigning a higher priority to a second external device than to a first external device, for example, the CPU 12 may execute a negotiation with the second external device for the supply of the electric power before the first external device after the reboot. Alternatively, in the case where a higher priority is assigned to the second external device, the CPU 12 may first execute a negotiation with the second external device for the supply of the electric power after the reboot and may not execute the negotiation with the first external device unless an event such as a request of a negotiation from the first external device has occurred.

With this configuration, in the case where a plurality of the external devices are being connected to the USB connector 19 after the reboot, the CPU 12 assigns a higher priority to the external device that has transmitted the job accepted by the CPU 12 and actually exchanged information relating to the image processing with the CPU 12. This operation enables the MFP 1 to supply electric power required for an external device that is highly likely to request a processing of the job, to the external device with a high priority.

The MFP 1 includes the image forming device 16 configured to print an image on a sheet. The job relating to the image processing in the present embodiment may be a print job for causing the image forming device 16 to print an image on a sheet based on image data received from a device that has transmitted the job. This configuration enables the CPU 12 to appropriately restart the supply of the electric power after the reboot even in the case where the reboot is executed in response to an update of the printing function, for example.

The MFP 1 includes the image reader 17 configured to read an image from a document. The job relating to the image processing in the present embodiment may be a reading job for causing the image reader 17 to read an image from a document, create the image data 155 relating to the image, and transmit the image data 155 to an external terminal that has transmitted the job such as the laptop PC 33. This configuration enables the CPU 12 to appropriately restart the supply of the electric power after the reboot even in the case where the reboot is executed in response to an update of the scanning function, for example.

The history information 153 includes the supply power amount (see FIG. 5) that is an amount of the electric power supplied to the external device via the USB connector 19 before the reboot. In the restart processing, the CPU 12 may determine the electric power to be supplied to the external device connected to the USB connector 19 based on the supply power amount of the history information 153.

With this configuration, the CPU 12 determines the electric power to be supplied to the external device after the reboot, based on the amount of the electric power actually supplied before the reboot. This makes it possible to more accurately reproduce the state of the electric power supplied before the reboot.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the USB standard in the embodiment is not limited to the USB PD standard and may be other standards according to which the electric power to be supplied is changeable by a negotiation. While the CPU 12 executes negotiations in the order from the data with the oldest negotiation-completion date and time, the present disclosure is not limited to this configuration. For example, the CPU 12 may execute negotiations in the order from the data with the latest negotiation-completion date and time. While the CPU 12 changes the timing of execution of the reboot based on whether the importance of the update of the control program 151 is high, the CPU 12 may not change the timing of execution of the reboot based on whether the importance of the update is high. In the case where the job is being executed, the CPU 12 executes the reboot after the completion of execution of the job but may interrupt the job to execute the reboot. In this case, the CPU 12 may restart the job interrupted after the reboot. While the CPU 12 stores information about supply of the electric power from the MFP 1 to the external device, into the history information 153 and uses the information for control after the reboot, the present disclosure is not limited to this configuration. The CPU 12 may store both of information about supply of the electric power from the MFP 1 to the external device and information about supply of the electric power from the external device to the MFP 1, into the history information 153 and use both for control after the reboot.

The storage location of the control program 151 is not limited to the ROM 14 and may be a storage medium readable by other computers. One example of the storage medium is a recording medium such as a RAM, a hard disk, a CD-ROM, and a DVD-ROM. While the CPU 12 is employed for the controller in the above-described embodiment, the present disclosure is not limited to this configuration. For example, the controller may be specific hardware such as application-specific integrated circuits (ASICs). The controller may be operated by processings executed by software and processings executed by hardware, for example. While the MFP 1 is employed for the information processing apparatus in the above-described embodiment, the present disclosure is not limited to this configuration. The information processing apparatus may be any of a printing apparatus, a copying machine, a facsimile machine, and a scanning machine.

What is claimed is:

1. An information processing apparatus, comprising:
    an interface, wherein the interface comprises a plurality of interfaces; and
    a controller,
    wherein the controller is configured to execute:
        storing, into a memory, history information relating to supply of electric power to an external device via the interface;
        rebooting a system of the information processing apparatus when the reboot of the system of the information processing apparatus is required during supply of the electric power to the external device via the interface; and
        restarting control of the supply of the electric power to the external device via the interface, based on the history information stored in the memory,
    wherein the controller is further configured to, when a first external device and a second external device each as the external device are being connected respectively to the plurality of interfaces before the reboot of the system of the information processing apparatus, and the second external device has executed a negotiation with the information processing apparatus for supply of the electric power before the first external device, execute the negotiation with the second external device in the restarting of the control before the first external device,
    wherein the history information comprises: first identification information and second identification information respectively for identifying the first external device and the second external device being connected respectively to the plurality of interfaces before the reboot of the system of the information processing apparatus; and first information indicating that the second external device has executed the negotiation with the information processing apparatus for supply of the electric power before the first external device, and
    wherein the controller is further configured to:
        determine in the restarting of the control whether the second identification information of the history information corresponds to identification information for identifying an external device being connected to one of the plurality of interfaces after the reboot of the system of the information processing apparatus, before determining, based on the first information, whether the first identification information corresponds to the identification information for identifying the external device being connected to the one of the plurality of interfaces after the reboot of the system of the information processing apparatus; and
        update the first information of the history information when the negotiation in the restarting of the control between the second external device and the information processing apparatus is finished.

2. The information processing apparatus according to claim 1,
    wherein the memory is a nonvolatile memory, and
    wherein the information processing apparatus comprises the memory.

3. The information processing apparatus according to claim 1, wherein the controller is configured to, when the reboot of the system of the information processing apparatus is required during the supply of the electric power to the external device via the interface, execute the storing of the history information and reboot the system of the information processing apparatus when the storing of the history information is completed.

4. The information processing apparatus according to claim 1,
    wherein the controller is configured to, in the restarting of the control, execute:
        determining whether the first identification information of the history information and identification information of the external device being connected to the interface correspond to each other; and
        performing a negotiation for supply of the electric power with the external device via the interface based on the history information, when the controller determines that the first identification information and the identification information correspond to each other.

5. The information processing apparatus according to claim 1, wherein the first information relates to a time at which the negotiation of each of the second external device and the first external device with the information processing apparatus for supply of the electric power is finished.

6. The information processing apparatus according to claim 1, further comprising a nonvolatile memory storing a control program,
    wherein the controller is configured to control the information processing apparatus by executing the control program, and
    wherein the controller is configured to execute the reboot of the system of the information processing apparatus when an update of the control program stored in the nonvolatile memory is required.

7. The information processing apparatus according to claim 1,
    wherein the history information comprises a supply power amount that is an amount of the electric power being supplied to an external device via the interface before the reboot of the system of the information processing apparatus, and
    wherein the controller is configured to determine the electric power to be supplied to the external device connected to the interface, based on the supply power amount of the history information in the restarting of the control.

8. The information processing apparatus according to claim 1, wherein the interface is a USB (Universal Serial Bus) connector.

9. A method of controlling an information processing apparatus, the information processing apparatus comprising an interface, wherein the interface comprises a plurality of interfaces,
wherein the method comprises:
   storing, into a memory, history information relating to supply of electric power to an external device via the interface;
   executing rebooting a system of the information processing apparatus when the reboot of the system of the information processing apparatus is required during supply of the electric power to the external device via the interface; and
   restarting control of the supply of the electric power to the external device via the interface, based on the history information stored in the memory,
wherein the method further comprises:
   when a first external device and a second external device each as the external device are being connected respectively to the plurality of interfaces before the reboot of the system of the information processing apparatus, and the second external device has executed a negotiation with the information processing apparatus for supply of the electric power before the first external device, executing the negotiation with the second external device in the restarting of the control before the first external device,
wherein the history information comprises: first identification information and second identification information respectively for identifying the first external device and the second external device being connected respectively to the plurality of interfaces before the reboot of the system of the information processing apparatus; and first information indicating that the second external device has executed the negotiation with the information processing apparatus for supply of the electric power before the first external device,
wherein the method further comprises:
   determining in the restarting of the control whether the second identification information of the history information corresponds to identification information for identifying an external device being connected to one of the plurality of interfaces after the reboot of the system of the information processing apparatus, before determining, based on the first information, whether the first identification information corresponds to the identification information for identifying the external device being connected to the one of the plurality of interfaces after the reboot of the system of the information processing apparatus; and
   updating the first information of the history information when the negotiation in the restarting of the control between the second external device and the information processing apparatus is finished.

10. A non-transitory storage medium storing a program executable by an information processing apparatus, the information processing apparatus comprising an interface, wherein the interface comprises a plurality of interfaces,
wherein when executed by the computer, the program causes the information processing apparatus to execute:
   storing, into a memory, history information relating to supply of electric power to an external device via the interface;
   rebooting a system of the information processing apparatus when the reboot of the system of the information processing apparatus is required during supply of the electric power to the external device via the interface;
   restarting control of the supply of the electric power to the external device via the interface, based on the history information stored in the memory;
   when a first external device and a second external device each as the external device are being connected respectively to the plurality of interfaces before the reboot of the system of the information processing apparatus, and the second external device has executed a negotiation with the information processing apparatus for supply of the electric power before the first external device, executing the negotiation with the second external device in the restarting of the control before the first external device,
   wherein the history information comprises: first identification information and second identification information respectively for identifying the first external device and the second external device being connected respectively to the plurality of interfaces before the reboot of the system of the information processing apparatus; and first information indicating that the second external device has executed the negotiation with the information processing apparatus for supply of the electric power before the first external device,
   determining in the restarting of the control whether the second identification information of the history information corresponds to identification information for identifying an external device being connected to one of the plurality of interfaces after the reboot of the system of the information processing apparatus, before determining, based on the first information, whether the first identification information corresponds to the identification information for identifying the external device being connected to the one of the plurality of interfaces after the reboot of the system of the information processing apparatus; and
   updating the first information of the history information when the negotiation in the restarting of the control between the second external device and the information processing apparatus is finished.

11. An information processing apparatus, comprising:
an interface, wherein the interface comprises a plurality of interfaces; and
a controller,
wherein the controller is configured to execute:
   storing, into a memory, history information relating to supply of electric power to an external device via the interface;
   rebooting a system of the information processing apparatus in a case where the reboot of the system of the information processing apparatus is required; and
   starting control of the supply of the electric power to the external device via the interface, based on the history information stored in the memory,
wherein the controller is further configured to, when a first external device and a second external device each as the external device are being connected respectively to the plurality of interfaces before the reboot of the system of the information processing apparatus, and the second external device has executed a negotiation with the information processing apparatus for supply of the electric power before the first external device, execute the negotiation with the second external device in the starting of the control before the first external device, wherein the history information comprises: first identification information and second identification information respectively for identifying the first external device and the second external device being connected respectively to the plurality of interfaces before the reboot of the system of the information processing apparatus; and first information indicating that the second external device has executed the negotiation with the information processing apparatus for supply of the electric power before the first external device, and wherein the controller is further configured to:
determine in the starting of the control whether the second identification information of the history information corresponds to identification information for identifying an external device being connected to one of the plurality of interfaces after the reboot of the system of the information processing apparatus, before determining, based on the first information, whether the first identification information corresponds to the identification information for identifying the external device being connected to the one of the plurality of interfaces after the reboot of the system of the information processing apparatus; and
update the first information of the history information when the negotiation in the starting of the control between the second external device and the information processing apparatus is finished.

12. An information processing apparatus, comprising:
an interface; and
a controller,
wherein the controller is configured to execute:
storing, into a memory, history information relating to supply of electric power to an external device via the interface;
rebooting when the reboot is required during supply of the electric power to the external device via the interface; and
restarting control of the supply of the electric power to the external device via the interface, based on the history information stored in the memory,
wherein the interface comprises a plurality of interfaces,
wherein the history information comprises first identification information and third identification information respectively for identifying a first external device and a third external device being connected respectively to the plurality of interfaces before the reboot, and
wherein the controller is configured to, when the first external device and the third external device corresponding respectively to the first identification information and the third identification information are connected respectively to the plurality of interfaces, assign a higher priority in the restarting of the control to a negotiation for supply of the electric power with the third external device corresponding to the third identification information that is older than the first identification information in a history, than to a negotiation for supply of the electric power with the first external device corresponding to the first identification information.

13. An information processing apparatus, comprising:
an interface; and
a controller,
wherein the controller is configured to execute:
storing, into a memory, history information relating to supply of electric power to an external device via the interface;
rebooting when the reboot is required during supply of the electric power to the external device via the interface;
restarting control of the supply of the electric power to the external device via the interface, based on the history information stored in the memory,
when the reboot is required during the supply of the electric power to the external device via the interface, execute obtaining a job relating to an image processing from the external device to which the electric power is being supplied, and determine whether the job is being executed;
wait without executing the reboot, when the controller determines in the obtaining of the job that the job is being executed; and
execute the reboot when the controller determines in the obtaining of the job that the job is not being executed.

14. An information processing apparatus, comprising:
an interface; and
a controller,
wherein the controller is configured to execute:
storing, into a memory, history information relating to supply of electric power to an external device via the interface;
rebooting when the reboot is required during supply of the electric power to the external device via the interface; and
restarting control of the supply of the electric power to the external device via the interface, based on the history information stored in the memory,
wherein the interface comprises a plurality of interfaces,
wherein the history information comprises job-acceptance information indicating whether a job relating to an image processing transmitted from the external device is accepted before the reboot, and
wherein the controller is configured to, when a plurality of external devices are being connected to the plurality of interfaces after the reboot, restart control of supply of the electric power via the plurality of interfaces based on the job-acceptance information of the history information in the restarting of the control by assigning a higher priority to an external device having accepted the job among the plurality of external devices connected to the plurality of interfaces.

15. The information processing apparatus according to claim 14, further comprising a printer configured to print an image on a sheet,
wherein the job relating to the image processing is a print job that causes the printer to print an image on a sheet based on image data received from a device that has transmitted the job.

16. The information processing apparatus according to claim 14, further comprising a reader configured to read an image from a document,
wherein the job relating to the image processing is a reading job that causes the reader to read an image from a document, create image data relating to the image, and transmit the image data to an external terminal that has transmitted the job.

17. An information processing apparatus, comprising:
an interface, wherein the interface comprises a plurality of interfaces; and
a controller,
wherein the controller is configured to execute:
- storing, into a memory, history information relating to supply of electric power to an external device via the interface;
- rebooting a system of the information processing apparatus when the reboot of the system of the information processing apparatus is required during supply of the electric power to the external device via the interface; and
- restarting control of the supply of the electric power to the external device via the interface, based on the history information stored in the memory, wherein the controller is further configured to, when a first external device and a second external device each as the external device are being connected respectively to the plurality of interfaces before the reboot of the system of the information processing apparatus, and the second external device has executed a negotiation with the information processing apparatus for supply of the electric power before the first external device, execute the negotiation with the second external device in the restarting of the control before the first external device, wherein the history information comprises: first identification information and second identification information respectively for identifying the first external device and the second external device being connected respectively to the plurality of interfaces before the reboot of the system of the information processing apparatus; and wherein the controller is further configured to delete the second identification information from the history information in the restarting of the control when the second identification information of the history information does not correspond to identification information for identifying an external device being connected to one of the plurality of interfaces after the reboot of the system of the information processing apparatus.

18. An information processing apparatus, comprising:
an interface;
a non-volatile memory storing a control program; and
a controller,
wherein the controller is configured to execute:
- storing, into a memory, history information relating to supply of electric power to an external device via the interface;
- rebooting a system of the information processing apparatus when the reboot of the system of the information processing apparatus is required during supply of the electric power to the external device via the interface;
- restarting control of the supply of the electric power to the external device via the interface, based on the history information stored in the memory,
- controlling the information processing apparatus by executing the control program,
- executing the reboot of the system of the information processing apparatus when an update of the control program stored in the nonvolatile memory is required;
- determining whether an importance of the update of the control program is high;
- rebooting the system of the information processing apparatus after executing the update, when the controller determines that the importance of the update is high; and
- continuing the supply of the electric power to the external device via the interface without executing the update, when the controller determines that the importance of the update is not high.

19. The information processing apparatus according to claim 18, wherein the controller is configured to, when the controller determines that the importance of the update is not high, wait for a particular length of time in the continuing of the supply of the electric power without executing the update and thereafter execute the reboot of the system of the information processing apparatus after executing the update.

* * * * *